Oct. 18, 1927.  
C. B. SANFORD  
1,645,874  
DIVING SINKER FOR DEEP SEA ANGLING  
Filed May 12, 1926
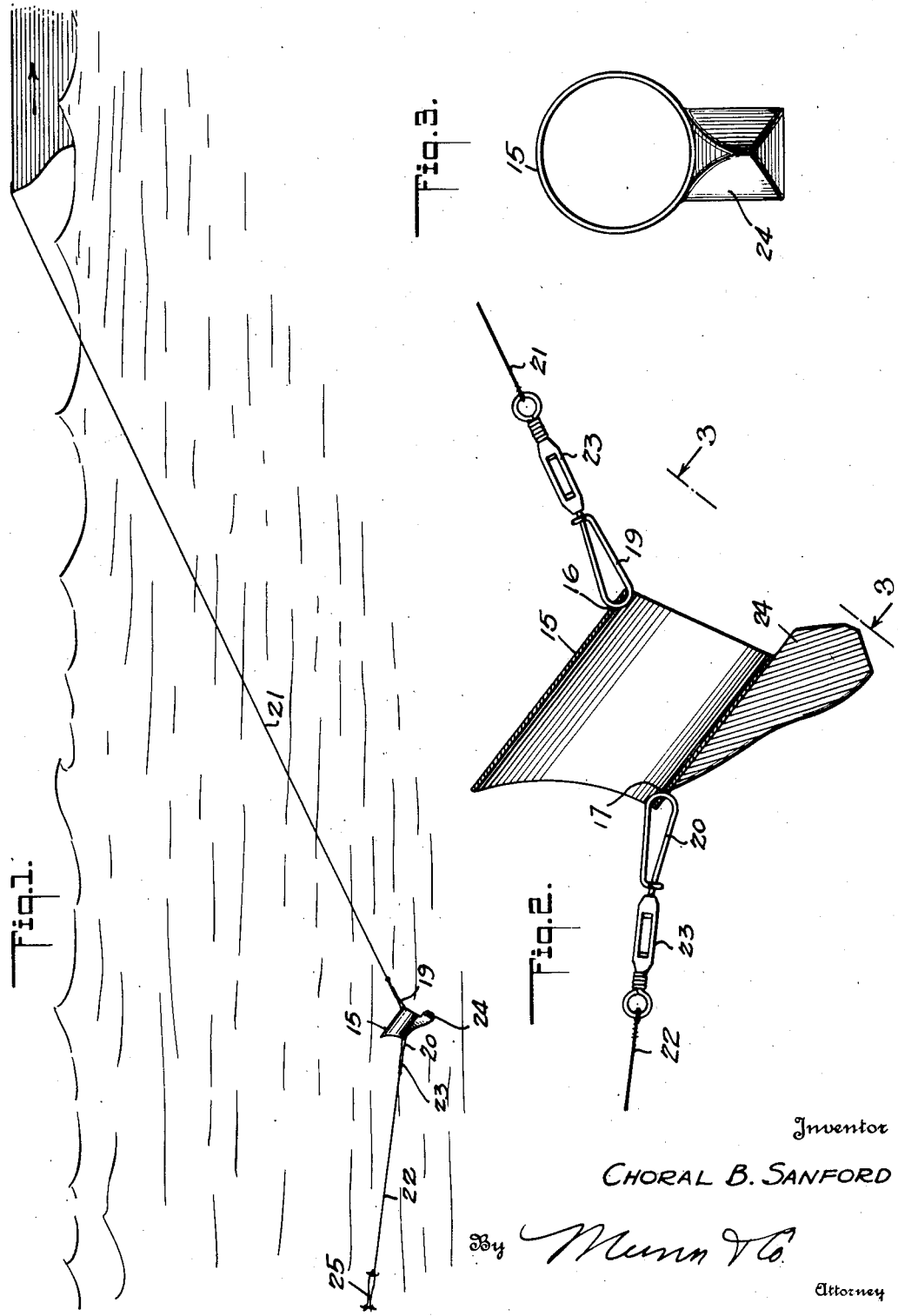
Inventor  
CHORAL B. SANFORD  
By Munn & Co.  
Attorney Patented Oct. 18, 1927.

1,645,874

UNITED STATES PATENT OFFICE.

CHORAL B. SANFORD, OF AVALON, CALIFORNIA.

DIVING SINKER FOR DEEP-SEA ANGLING.

Application filed May 12, 1926. Serial No. 108,583.

My invention relates to and has for its purpose the provision of a sinker for use in trolling fish lines in deep sea angling and which automatically operates to cause the spinner or other form of real or artificial bait to dive and remain submerged irrespective of the speed of the boat from which the trolling line is extended or the length of the line.

I will describe only one form of diving sinker for deep sea angling embodying my invention, and will then point out the novel features thereof in claims.

In the drawings

Figure 1 is a view showing in side elevation one form of sinker embodying my invention in applied position to a trolling line;

Figure 2 is an enlarged vertical sectional view of the sinker shown in Figure 1, and in applied position to the trolling line;

Figure 3 is a view showing the sinker in front elevation and taken on the plane indicated by the line 3—3 of Figure 1.

Referring specifically to the drawings, in which similar reference characters refer to similar parts, my invention in its present embodiment comprises a body 15 formed of any suitable material, such as metal or the like, and in the present instance of tubular form, with openings 16 and 17 formed therein at the opposite ends and at diametrically opposed points. Through these openings attaching loops 19 and 20, respectively, are extended for connecting a trolling line 21 and a bait lead line 22 respectively to the opposite ends of the body, swivels 23 being interposed between the attaching loops and the lines.

Fixed to the body 15 at its lower side is a weight 24 formed of lead or other suitable material, and tapered with its thick or heavy end extending beyond the adjacent end of the body so as to cause the body to be weighted at its forward end and to thus assume the inclined position shown in Figure 2 when in operative position in the water. The heavy end is preferably pointed and the side walls thereof are dished or concave, such a construction eliminating any tendency of the entire device running to one side or the other when drawn through the water.

In actual practice the lines 21 and 22 are attached to the sinker as previously described, with the lead line 22 carrying the spinner or other form of bait 25 (Figure 1). With the trolling line extended from the stern end of a forwardly travelling boat as shown in Figure 1, the sinker immediately dives to a submerged position, carrying with it the trolling line and the lead line. Under the forward movement of the trolling line, the sinker functions to maintain the lead line and the spinner beneath the surface of the water so that they travel through a submerged path which has been found, in practice, to be far more effective in catching fish, particularly of a deep sea variety.

The operation of the sinker as just described is effected through a coaction of the water and the tubular body of the sinker, the weight 24 causing the sinker to occupy the inclined position shown whereby, under the forward movement of the sinker, water is caused to flow through the tubular body and to thereby exert a force against the lower inner wall of the body which is downward, thereby constantly acting to move the sinker downwardly in the water.

Although I have herein shown and described only one form of diving sinker for deep sea angling embodying my invention, it is to be understood that various changes and modifications may be made therein without departing from the spirit of the invention and the spirit and scope of the appended claims.

I claim:

1. A diving sinker for use in trolling comprising a tubular body weighted at one end and open at both ends to permit the passage of water through the body, said sinker adapted to be interposed between and connected to trolling and leader lines in such manner that when trolling, the body will be inclined downwardly and forwardly so that water will move through the body and cause the sinker to dive and maintain the leader line submerged.

2. In combination, a sinker having a tubular body, a trolling line connected to one end of the body, a lead line connected to the other end of the body, and a weight on the body adapted to cause the tubular body to occupy an inclined position when trolling so that water will be caused to move through the tubular body in a manner to cause the sinker to dive and thus maintain the lead line submerged.

3. In combination, a sinker having a body, a trolling line connected to the body, a lead line connected to the body, and a weight on the body adapted to cause the latter to occupy an inclined position when trolling so that water will be caused to move through the body in a manner to cause the sinker to dive and thus maintain the lead line submerged.

4. A diving sinker comprising a body adapted to be interposed between and connected to trolling and leader lines, said body having means defining a passage through which water is adapted to move, and a weight on the body operating when trolling to cause the body to occupy a position in which the passage will be inclined downwardly and forwardly, whereby water will act against the wall of the passage during movement through the latter to cause the sinker to dive and maintain the leader line submerged.

5. A diving sinker comprising a body adapted to be interposed between and connected to trolling and leader lines, said body having a cupped surface defining a passage through which water is adapted to move, and a weight on the body operating when trolling to cause the body to occupy a position in which the passage will be inclined downwardly and forwardly whereby water will act against the wall of said passage during movement through the latter to cause the sinker to dive and maintain the leader line submerged.

6. A diving sinker comprising a tubular open-ended body adapted to be interposed between and connected to trolling and leading lines at points diametrically opposite to each other and at opposite ends of the body, and a weight on the body at its underside, said weight projecting beyond the forward end of the body with the forward end portion of the weight pointed and the side walls thereof dished to steady the sinker when drawn through the water.

CHORAL B. SANFORD.